Aug. 24, 1965  S. BUKATA  3,202,792
BRAZING FURNACE
Filed Sept. 25, 1962  3 Sheets-Sheet 1

INVENTOR.
STEPHEN BUKATA
BY Arthur H. Seidel
ATTORNEY

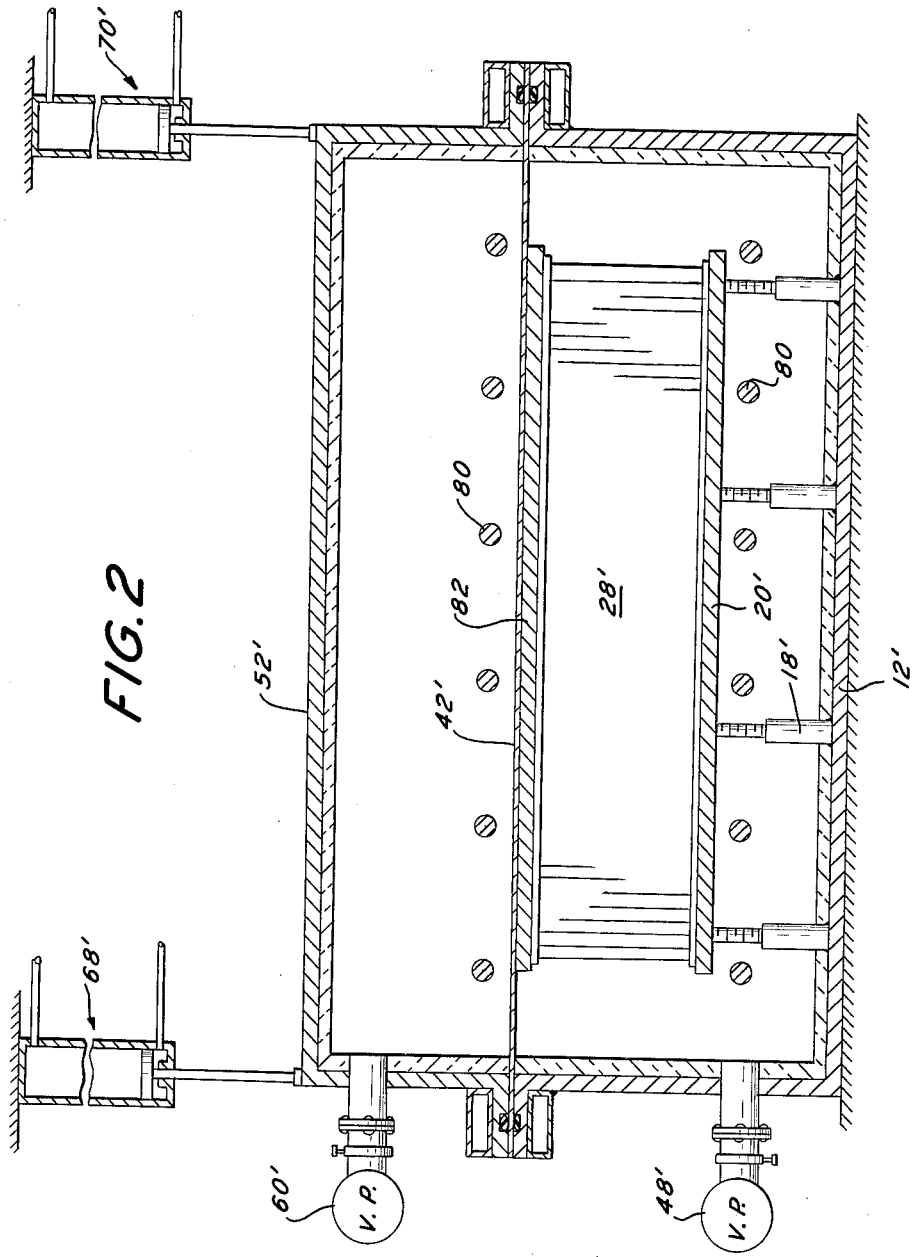

Aug. 24, 1965     S. BUKATA     3,202,792
BRAZING FURNACE
Filed Sept. 25, 1962     3 Sheets-Sheet 3
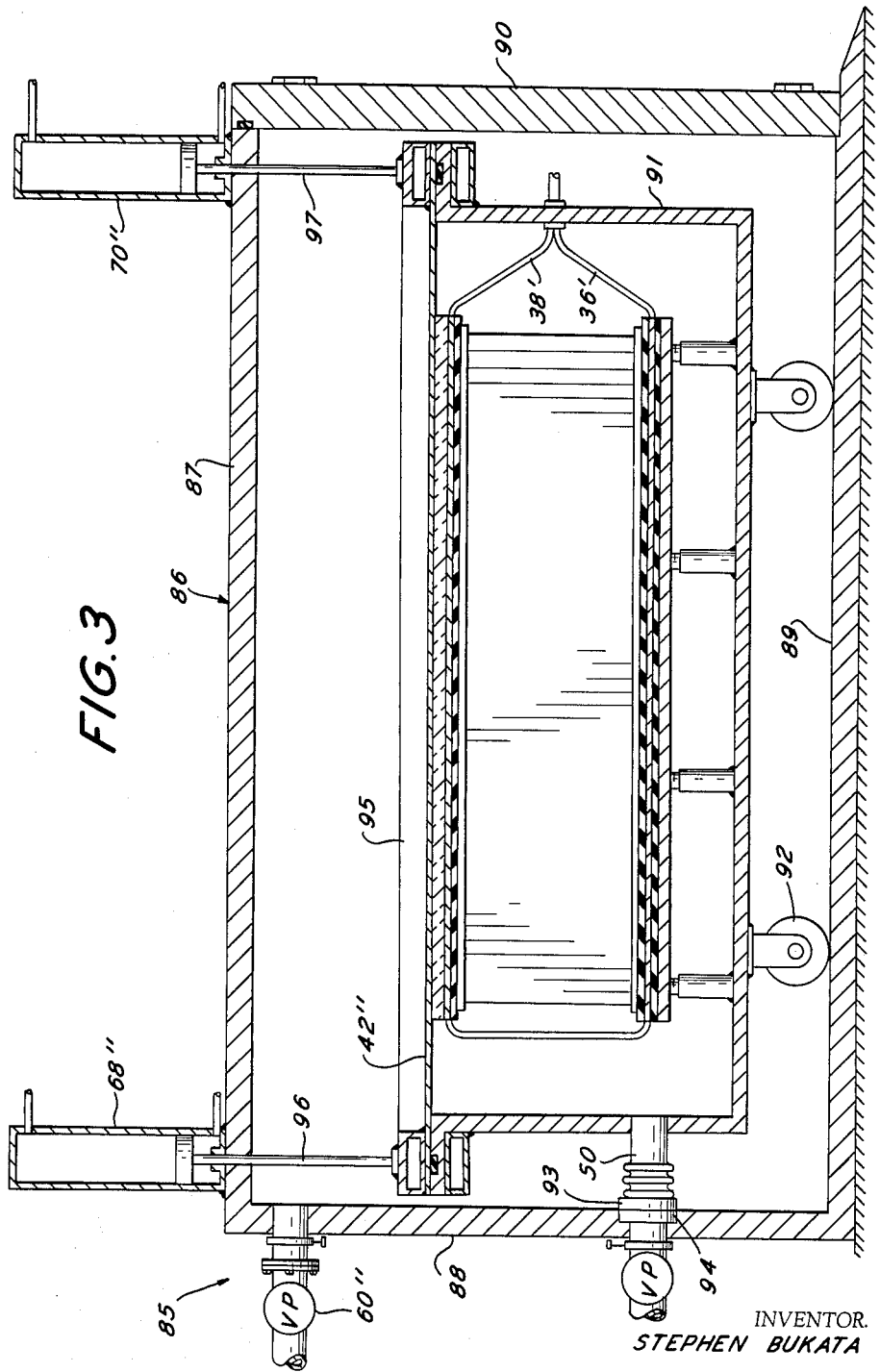
INVENTOR.
STEPHEN BUKATA
BY Arthur H. Seidel
ATTORNEY

United States Patent Office 3,202,792
Patented Aug. 24, 1965

3,202,792
BRAZING FURNACE
Stephen Bukata, 7813 Ardleigh St., Philadelphia, Pa.
Filed Sept. 25, 1962, Ser. No. 226,013
13 Claims. (Cl. 219—85)

This invention relates to a brazing furnace, and more particularly to a brazing furnace designed to facilitate the rapid brazing of honeycomb panels.

This application is a continuation-in-part of my co-patent application Serial No. 745,129 filed on June 27, 1958, now Patent 3,793,104 issued June 11, 1963, and entitled Furnace.

The brazing furnace of the present invention greatly simplifies the brazing furnace disclosed in the above-mentioned patent and facilitates the more rapid brazing of honeycomb panels. In accordance with one embodiment of the present invention, a honeycomb panel is disposed between spaced planar electrical heating means within a U-shaped rigid housing. A flexible impervious sheet is juxtaposed to the open end of the housing. Means are provided to bias the flexible sheet so as to provide a uniform pressure across the honeycomb panel. Such means may assume a wide variety of forms. For the purpose of the present discussion, the means includes the provision of an evacuated chamber above and below the sheet.

The pressure in the evacuated chamber above the flexible sheet is slightly greater than the pressure below the sheet. Each of the pressures is selectively variable. If only the chamber below the flexible sheet were evacuated, there would be a tendency to crush the honeycomb panel. If adequate control means are provided, only the chamber below the flexible sheet may be evacuated so that only several pounds per square inch pressure is exerted through the flexible sheet to the honeycomb panel.

In another embodiment of the present invention, a heating means is provided in the chambers above and below the honeycomb panel. In each embodiment the lowermost support for the panel may be raised or lowered.

It is an object of the present invention to provide a novel brazing furnace.

It is another object of the present invention to provide a novel brazing furnace which is simpler than those proposed heretofore.

It is another object of the present invention to provide a novel brazing furnace which includes only one flexible sheet.

It is another object of the present invention to provide a novel brazing furnace which is simpler than those proposed heretofore and capable of brazing honeycomb panels more rapidly than those proposed heretofore.

Other object will appear hereinafter.

For the purpose of illustrating the invention there is shown in the drawings forms which are presently preferred; it being understood, however, that this invention is not limited to the precise arrangement and instrumentalities shown.

FIGURE 2 is a view similar to FIGURE 1 but illustrating another embodiment.

FIGURE 3 is a view similar to FIGURE 1 but illustrating another embodiment.

Referring to the drawing in detail, wherein like numerals indicate like elements, there is shown in FIGURE 1 a brazing furnace designated generally as 10.

Figure 1:
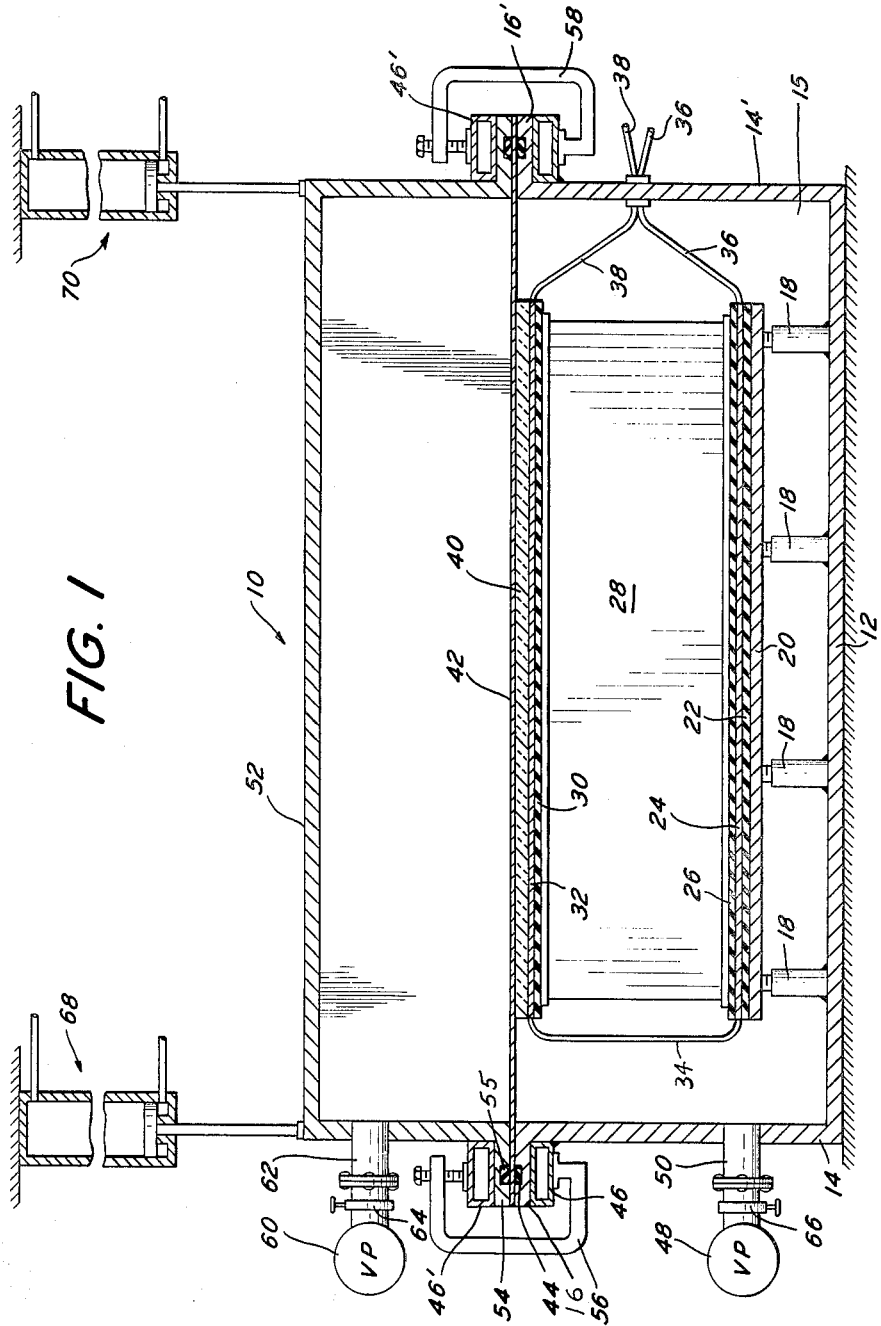
FIGURE 1 is a vertical sectional view through the brazing apparatus of the present invention.

The brazing furnace 10 includes a U-shaped housing having a bottom wall 12 and upright side walls. If the housing is rectangular, the housing will be provided with side walls 14 and 14' as well as end wall 15 (only one end wall shown). If desired, the U-shaped housing may be cylindrical. The open end of the U-shaped housing is provided with peripheral radially outwardly extending flanges 16 and 16'. The U-shaped housing and its flanges are made from a rigid material capable of withstanding the atmosphere pressure when the interior of the housing is evacuated.

The bottom wall 12 has a plurality of adjustable pipe supports 18 fixedly secured thereto. The pipe supports 18 are upright and support a rigid metal support plate 20. The pipe supports 18 act as spacers to space the support plate 20 from the bottom wall 12 and decrease the amount of thermal conduction to the bottom wall 12.

A layer of thermal insulation 22 overlies the support plate 20. The layer 22 may be a layer of Fiberfrax or Refrasil, which materials are thermal insulators. A first planar electrical heating means 24 overlies the layer 22. Such heating means may be a blanket heating element such as a layer of graphite fabric, a Nichrome mesh, etc. A sheet of electrical insulation 26 overlies the heating means 24. A honeycomb panel 28, which is to be brazed in the furnace 10 of the present invention, is adapted to overlie the sheet of electrical insulation 26.

Each of the elements 22, 24 and 26 is relatively thin. The layer 22 prevents or detracts from the possibility of conducting heat from the means 24 through the pipe supports 18 to the bottom wall 12. The sheet of electrical insulation 26 prevents the heating means 24 from being in direct contact with the honeycomb panel 28 thereby tending to prevent a short circuit.

A sheet of electrical insulation 30 overlies the honeycomb panel 28. Sheet 30 is identical with sheet 26 and performs the same function. A second planar electrical heating means 32 overlies the sheet 30. Heating means 32 may be identical with heating means 24. The first and second heating means 24 and 32 are electrically coupled together by a conductor 34. A conductor 36 extends through a seal in wall 14' and is coupled to the electrical heating means 24. A conductor 38 extends from heating means 32 through the above-mentioned grommet in wall 14'. The conductors 36 and 38 are adapted to be coupled to a source of electrical potential.

A layer of thermal and electrical insulation 40 overlies the heating means 32. An impervious imperforate flexible metal sheet 42 overlies the open end of the U-shaped housing. The periphery of the sheet 42 is juxtaposed to the periphery of the housing with a seal such as O-ring 44 disposed between the peripheral portion of the sheet 42 and the flanges 16 and 16'. It will be noted that the height of the side walls 14 and 14' corresponds generally to the height of the honeycomb panel 28, its support within the U-shaped housing, the heating means and the layers of insulation.

A hollow conduit 46 is disposed below the flanges 16 and 16'. A cooling medium is adapted to flow through the conduit 46 to prevent excess heat from being conducted to the O-ring seal 44. Hence, it will be noted that the peripheral portions of the sheet 42 and the flanges 16 and 16' are outside of the heat zone produced by the heating means 24 and 32. The conduit 46 with a coolant medium flowing therethrough is an added precaution to assure that the O-ring seal 44 will not be damaged by heat which is either radiated or conducted thereto.

A vacuum pump 48 is in communication with the U-shaped housing by means of conduit 50. In order for a vacuum to be produced within the U-shaped housing below the sheet 42, the pressure therein must be reduced to such a point whereby atmospheric pressure acting on the sheet 42 would crush the honeycomb panel 28. Accordingly, a U-shaped housing 52 is positioned above the sheet 42 and is coextensive therewith. The housing 52 is provided with a radially outwardly directed flange 54 at its open end thereof. The flange 54 overlies the peripheral portion of the sheet 42 and the flanges 16 and 16'. An O-ring seal 55 in flange 54 engages the uppermost surface of the peripheral portion of sheet 42. The peripheral portions of the U-shaped housings and the sheet 42 are clampingly held together by releasable C-shaped clamps 56 and 58 which embrace conduits 46 and 46'. A vacuum pump 60 is in communication with the interior of the housing 52 through a conduit 62 and valve 64.

A valve 66 is provided between the vacuum pump 48 and the wall 14. A uniform pressure may be applied by the flexible sheet 42 against the honeycomb panel 28 by evacuating the chambers above and below the sheet 42. The pressure within the chamber above the sheet 42 will be somewhat higher than the pressure below the sheet 42. Such pressure differential may be approximately 5 to 50 mm. of mercury. It will be appreciated by those skilled in the art that the housing 52 which provides a chamber above the sheet 42 may be eliminated if the chamber below the sheet 42 is evacuated and refilled with an inert gas. The housing 52 is adapted to be raised and lowered toward and away from the remaining structure of the apparatus 10 by means of pressure cylinders 68 and 70. If desired, the function of clamps 56 and 58 may be accomplished by cylinders 68 and 70.

Operation of the apparatus 10 is as follows:

The brazing of the honeycomb panel takes place with the elements structurally interrelated in the manner illustrated in the drawing. The steps necessary to attain the structural interrelationship illustrated are as follows: The layer of thermal insulation 22 is placed over the support plate 20 which may be a steel support plate having a thickness of approximately one-half inch. The blanket heating element 24 is then placed over the layer 22 making certain that the heating element does not contact the support plate 20. Thereafter, the sheet of electrical insulation 26, which is provided with dimensions greater than the dimensions of the honeycomb panel 28, is placed over the blanket heating element.

The honeycomb panel 28 is in the nature of a sandwich having upper and lower sheets juxtaposed to a honeycomb structure having brazing material thereon. The honeycomb panel 28 is placed over the sheet 26. Thereafter, the sheet of electrical insulation 30 is placed over the honeycomb panel 28. The sheet 30 is of sufficient size so as to prevent direct contact between the honeycomb panel 28 and the blanket heating element 32. The blanket heating element 32 is placed over the sheet 30 and then the layer of insulation 40 is placed over the blanket heating element.

Then the blanket heating elements 24 and 32 are interconnected by means of a conductor 34. The conductors 36 and 38 are then connected to the blanket heating elements. Thereafter, the sheet 42 is placed over the open end of the U-shaped housing with an O-ring seal 44 disposed between the flanges 16 and 16' and the peripheral portion of the sheet 42. The pressure cylinders 68 and 70 are actuated so as to lower the U-shaped housing 52 to the disposition illustrated in the drawing. Thereafter, the C-shaped clamps 56 and 58 are applied to the peripheral portions of the apparatus 10. If properly designed, the cylinders 68 and 70 may be used to apply pressure to seal the O-rings against sheet 42. A coolant medium is flowed through the conduits 46 and 46'. The vacuum pumps 48 and 60 are actuated so as to reduce the pressure above and below the sheet 42. By manipulation of the valves 64 and 66, the pressure above the sheet 42 will be maintained greater than the pressure below the sheet 42. The differential in pressure above and below the sheet 42 causes the sheet 42 to flex downwardly and bias the elements 22–40 into engagement with each other against the support plate 20.

The apparatus 10 is now in condition to effect a brazing operation. The conductors 36 and 38 will be connected to a source of electrical potential such as a conventional 220 volt source of A.C. The blanket heating elements 24 and 32 rapidly attain operating temperature to apply heat uniformly to opposite sides of the honeycomb panel 28 across the full width and length thereof. The time required to effect a braze joint between the elements of the honeycomb panel 28 depends upon the metals from which the panel 28 are constructed and the brazing alloy utilized.

When a brazed joint has been attained between the components of the honeycomb panel 28, the coupling between the conductors 36 and 38 and the source of potential is interrupted. Also, the pressure above and below the sheet 42 is equalized at atmospheric pressure. When the C-shaped clamps 56 and 58 are removed, the U-shaped housing may be raised by actuating the pressure cylinders 68 and 70. Thereafter, sheet 42 will be removed, each end of the conductor 34 will be disconnected, layer 40 will be removed, heating element 32 will be rolled up and placed to one side, and then sheet 30 will be removed. Upon the completion of these steps, the brazed honeycomb panel is exposed for removal from the furnace 10.

The simplicity of the furnace 10 facilitates the rapid brazing of honeycomb panels. The utilization of blanket heating elements above and below the honeycomb panel within the evacuated chamber facilitates the application of uniform heat to the honeycomb panel so as to preclude the possibility of warpage. The utilization of evacuated chambers above and below the single sheet 42 facilitates uniform distribution of pressure across the full width and length of the honeycomb panel and eliminates the need for inert gas.

In FIGURE 2, there is disclosed another embodiment of the present invention designated generally as 10'. The furnace 10' is identical with furnace 10 except as will be made clear hereinafter. Hence, like elements have primed numerals.

In furnace 10', the heating means are on each of the U-shaped housings. Such heating means may be globars 80. An insulation lining is provided on the inner surface of each of the U-shaped housings. The panel 28' rests on plate 20' and sheet 82 overlies panel 28. Plate 20' is preferably a heat sink and may be a graphite plate. Sheet 82 is preferably made of the same material as layer 22. The cylinders 68' and 70' are orientated so that piston rods 84 and 86, respectively, apply sufficient pressure downwardly to maintain the seal at the periphery of the sheet 42'.

In FIGURE 3, there is illustrated another embodiment of the present invention designated generally as 85. The brazing furnace 85 includes a housing 86 having a top wall 87, a rear wall 88, a bottom wall 89, side walls (unnumbered) and a front wall defined by a pivotably supported door 90.

A U-shaped housing 91 similar to the U-shaped housing in FIGURE 1 is disposed in housing 86. Housing 91 is provided with wheels 92 to facilitate entry and removal of the housing 91 with respect to the housing 86. Since housing 91 and the components therewithin are identical with that illustrated in FIGURE 1, it is not deemed necessary to explain the same in detail. However, it will be noted that the evacuation conduit 50' terminates in a flange 93 which is adapted to cooperate with and be coupled to a flange 94 supported by the wall 88.

A hollow channel member 95 overlies the radially outwardly directed flange on the housing 91 and is secured to the peripheral portion of the flexible sheet 42''. Member 95 is secured to piston rods 96 and 97 which extend through the top wall 87 on the housing 86. Piston rods 96 and 97 are secured at their upper end to a piston disposed within the pressure cylinders 68'' and 70''. The interior of housing 86 is adapted to be evacuated by a vacuum pump 60''. The electrical conductors 36' and 38' are adapted to be coupled to an electrical connection on a side wall of the housing 86.

The furnace 85 operates in the same manner as furnace 10 except as will be pointed out hereinafter.

The furnace 85 facilitates more rapid brazing since a plurality of wheel mounted U-shaped housings 91 may be provided. While one U-shaped housing 91 is disposed within the housing 86 and a brazing operation is being effected as illustrated in FIGURE 3, a second U-shaped housing 91 may be in the process of being loaded for entry into the housing 86.

When the U-shaped housing 91 is ready for entry into the housing 86, the door 90 will be opened and the housing 91 will be pushed into the housing 86. While this is occurring, the member 95 will be in an elevated position and pumps for evacuating housings 86 and 91 will be inoperative. The flange 93 will be coupled to the flange 94. The abutment of these flanges automatically orientates the housing 91 with respect to the electrical connections to be made and positions the peripheral edge of the sheet 42'' below the member 95. As soon as flanges 93 and 94 have been coupled, the electrical conductors 36' and 38' will be coupled to a source of electrical potential. The door 90 will then be closed and suitable valving pressure will be introduced into the cylinders 68'' and 70'' to cause the member 95 to descend to the position illustrated in FIGURE 3. The cylinders 68'' and 70'' apply sufficient pressure on the member 95 to effect a seal at the periphery of the sheet 42''. Thereafter, housings 91 and 86 will be evacuated as described above and brazing of a panel will be effected.

The present invention may be embodied in other specific forms without departing from the spirit or essential attributes thereof and, accordingly, reference should be made to the appended claims, rather than to the foregoing specifications as indicating the scope of the invention.

I claim:

1. A brazing furnace comprising a U-shaped rigid housing, spaced planar electrical heating means within said housing, an impervious flexing envelope sheet juxtaposed to the open end of said housing and defining the closure for said housing, a seal between the open end of said housing and a peripheral portion of said sheet, means electrically insulating said heating means from said sheet and said housing, and means acting through said sheet for applying substantially uniform pressure across the full width and length of a honeycomb panel adapted to be supported within said housing, below said sheet, and between said heating means.

2. A brazing furnace in accordance with claim 1 wherein said last mentioned means includes a vacuum pump for evacuating said U-shaped housing.

3. A brazing furnace in accordance with claim 1 wherein said last mentioned means includes a second housing having a chamber coextensive with the interior of said first mentioned housing, means clamping a peripheral portion of said sheet between peripheral portions of said housings, and said last mentioned means including a vacuum pump for evacuating said chamber and the interior of said first mentioned housing, with the pressure in said chamber being slightly greater than the pressure within the interior of said first mentioned housing.

4. Apparatus in accordance with claim 1 wherein said pair of spaced planar electrical heating means include graphite blanket heating elements.

5. Apparatus in accordance with claim 1 wherein said last mentioned means includes a means for decreasing the pressure above said sheet to a first pressure which is below atmospheric pressure and means for decreasing the pressure within said housing to a second pressure which is below atmospheric pressure, and said second pressure being lower than said first pressure.

6. A brazing furnace comprising a U-shaped rigid housing having a flat bottom wall and upright side walls, the end of said side walls remote from said bottom wall having horizontally disposed outwardly directed flanges, a support plate within said housing and substantially parallel to said bottom wall, means supporting said support plate in spaced relation from said bottom wall, an impervious flexible envelope sheet juxtaposed to the open end of said housing, a seal between peripheral portions of said sheet and said flanges, means for cooling said seal, a layer of thermal insulation overlying said support plate, a first blanket heating element overlying said layer of thermal insulation, a sheet of electrical insulation overlying said blanket heating element, said sheet of electrical insulation being adapted to have a honeycomb panel supported thereon, a second sheet of electrical insulation within said housing and adapted to overlie the honeycomb panel, a second blanket heating element overlying said second sheet of electrical insulation, a second layer of thermal and electrical insulation overlying said second blanket heating element, one surface of said envelope sheet being juxtaposed to one surface of said last mentioned layer of insulation, and the distance between said one surface of said last mentioned layer of insulation and the inner surface of said bottom wall being substantially equal to the height of said side walls of said housing.

7. A brazing furnace in accordance with claim 6 including means for evacuating the interior of said housing and applying a uniform pressure on said sheet to bias said last mentioned layer of insulation toward said support plate.

8. A furnace in accordance with claim 1 including supporting means for said honeycomb structure and adjustable members below said supporting means for selectively varying the height of said supporting means.

9. A furnace in accordance with claim 3 wherein said clamping means is selectively operable means for applying pressure to said second housing so that portions of said seal means is in air-tight clamping engagement with said peripheral portion of said sheet.

10. A furnace in accordance with claim 1 wherein said heating means includes a heater below said supporting means and a heater supported by said second housing.

11. A furnace in accordance with claim 1 wherein said U-shaped housing is mounted on wheels, and a second housing within which said U-shaped housing may be disposed.

12. A furnace in accordance with claim 11 including a movable member supported by said second housing, said movable member being juxtaposed to the periphery of said envelope sheet, and means for applying pressure on said movable member to effect a seal between the periphery of said sheet and the periphery of said U-shaped housing.

13. A brazing furnace comprising a U-shaped rigid housing, spaced electrical heating means for applying heat to a honeycomb panel adapted to be supported within said U-shaped housing between said heating means, an impervious flexible sheet juxtaposed to the open end of said housing defining the closure for said housing, a seal between the open end of said housing and a peripheral portion of said sheet, means electrically insulating said heating means from said sheet and said housing, and means acting through the flexibility of said sheet for applying substantially uniform pressure across the full width and length of a honeycomb panel adapted to be supported within said housing, below said sheet, and between said heating means.

References Cited by the Examiner

UNITED STATES PATENTS

| | | | |
|---|---|---|---|
| 2,404,736 | 7/46 | Marick | 219—537 |
| 2,984,732 | 5/61 | Herbert | 219—85 X |
| 3,011,926 | 12/61 | Rowe | 219—85 X |

RICHARD M. WOOD, *Primary Examiner.*